United States Patent [19]

Lockhart, Jr.

[11] Patent Number: 5,022,079

[45] Date of Patent: Jun. 4, 1991

[54] LOCK MEANS AND TV SYNC FOR AIR-TO-SURFACE MISSILE

[75] Inventor: John C. Lockhart, Jr., Oreland, Pa.

[73] Assignee: The United States of America as represented by the Secretary of the Navy, Washington, D.C.

[21] Appl. No.: 394,389

[22] Filed: Aug. 31, 1964

[51] Int. Cl.[5] .............................................. H04N 7/167

[52] U.S. Cl. ...................................... 380/14; 358/136; 358/137; 358/261.1; 328/72; 328/187; 244/3.14

[58] Field of Search ...................... 325/32, 58; 178/22, 178/3, 5.1, 6.8, 69.5; 328/55, 155, 187, 63, 72, 73; 235/150.21; 244/14, 77, 3; 340/172.5, 204, 293; 380/14; 358/109, 149, 137, 261.1, 136

[56] References Cited

U.S. PATENT DOCUMENTS

| | | | |
|---|---|---|---|
| 2,736,769 | 2/1956 | Macovski | 178/7.3 |
| 2,814,671 | 11/1957 | Adler et al. | 178/7.3 |
| 2,860,333 | 11/1958 | Flowers et al. | 343/17.1 |
| 2,861,179 | 11/1958 | Jacob et al. | 244/14 |
| 2,934,604 | 4/1960 | Bizet | 178/69.5 |
| 2,995,624 | 8/1961 | Watters | 178/22 |
| 3,113,291 | 12/1963 | Fiske | 325/58 |
| 3,180,927 | 4/1965 | Heppe et al. | 178/5.1 |

*Primary Examiner*—Nelson Moskowitz
*Attorney, Agent, or Firm*—James V. Tura; James B. Bechtel; Susan E. Verona

[57] ABSTRACT

1. A digital code synchronization locking means comprising:

means to receive a first digital code sequence;

means to generate a second digital code sequence substantially similar to said first sequence, said means to generate said (second) digital code sequence including:

a shift register having an output from a predetermined stage thereof;

a feedback logic matrix connected to said shift register for generating said second digital code sequence;

a binary pulse counter, the last stage of which provides a reset pulse to all the stages of said shift register;

means to detect drift from synchronization of said second code sequence with said first code sequence one stage before said predetermined stage and one stage after said predetermined stage;

a clock oscillator providing clock pulses to all stages of said shift register and to the first stage of said binary counter; and an oscillator control connected to said clock oscillator and responsive to said means to detect drift for advancing the rate of said clock oscillator upon correlation of said first code sequence with said one stage before said predetermined stage and retarding the rate of said clock oscillator upon correlation of said first code sequence with said one stage after said predetermined stage, whereby said second code sequence is maintained in synchronization with said first code sequence.

6 Claims, 2 Drawing Sheets

LOCK MEANS AND TV SYNC FOR AIR-TO-SURFACE MISSILE

The invention described herein may be manufactured and used by or for the Government of the United States of America of governmental purposes without the payment of any royalties thereon or therefor.

This invention relates to a synchoronization locking means and a TV synchronization means in a command data link and TV return link for a missile.

In the CONDOR missile system an air-to-ground missile is launched from an aircraft which then stands off from the target a considerable distance, anywhere from 40 to 100 miles or more. In order to guide the missile correctly from the aircraft it is necessary to have contact with the missile over a wide distance and also to be able to see in the aircraft what the view is to the missile at any moment. The CONDOR missile system provides a two-way data and TV link system between the aircraft and the missile in which control signals are issued from the aircraft to the missile and the missile by TV cameras sends back to the aircraft a picture of the view present to the missile. Prior aircraft-missile communications systems have suffered by being susceptible to jamming, i.e., signals similar to those issued by the aircraft or by the missile have been issued by unfriendly jamming stations which resulted in false signals being given to the missile or the aircraft or both.

In an application Ser. No. 370,741 of Bruce R. Meuron and Joseph B. Lyons, Jr., for Data Link and Return Link, filed May 27, 1964, of common assignment with this application, a Data Coder, Code Searching Mechanism, Data Decoder, and Range Computer for an aircraft-missile communications system were disclosed by which a coded data and TV link system providing a very substantial anti-jam capability was provided. Reference may be made to that application for any details therein pertinent to the present invention. The present invention provides a lock means for the code synchronization means disclosed in the above-said application and a TV synchronization means for the TV return link in the CONDOR missile. The lock means comprises a comparison means for comparing a specific generated code bit with bits immediately earlier and immediately later than the corresponding specific code bit of the received code. If correlation to some extent is noted between either of these two signals and the received signal, the early or late correlator, as the case may be, will send a signal to the control point on the oscillator clock which will speed it up or slow it down as required to provide a correction. The TV synchronization means substitutes a portion of the code itself for the previously used synchronization pulses. The camera in the missile and the TV monitor in the aircraft are then both synchronized by timing information from the code generators which have been locked in synchronization with each other.

Accordingly, it is an object of the present invention to provide a lock means for locking in synchronization of two codes which have been synchronized with each other.

Another object of the invention is to provide a synchronization means for the TV link of an aircraft-to-missile communications system which eliminates the need for synchronization pulses.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
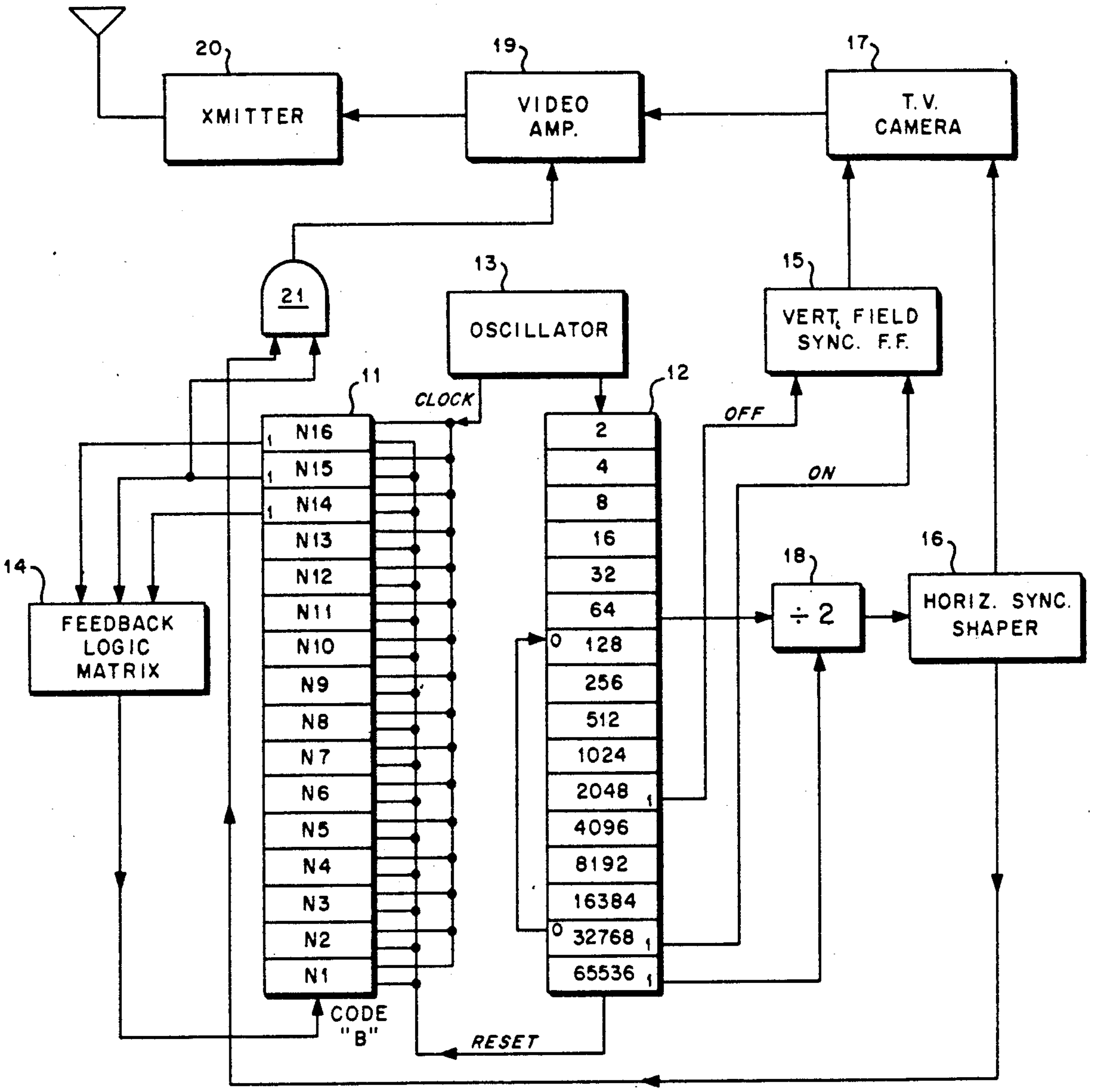
FIG. 1 shows a block diagram of a system in a missile according to the present invention.

Referring now to FIG. 1 the missile system contains a code generator 11 and controlling counter 12. Code generator 11 is a shift register shifted by the pulses from oscillator 13 and generating at any of its component positions a succession of bits comprising ones and zeros. There is feedback from some of the positions to a feedback logic matrix 14 which feed back to the first position in the generator. The exact sequence of ones and zeros in the code generator will be determined by the positions from which signals will be led to the matrix and by the nature of the logic circuitry within the matrix. The code sequence in generator 11 is advanced through generator 11 by the succession of pulses from oscillator 13. Counter 12 is a succession of sixteen flip-flops which would divide the incoming pulses by $2^{16}$. The division in counter 12 does not quite come up to this as there is feedback from the fifteenth stage to the seventh stage. When the counter arrives at the end of its cycle it sends a reset signal to all of the stages or shift register 11. The operation of the code generator 11 and counter 12 is disclosed in detail in the above-cited application of Meuron and Lyons, to which reference may be had for the details thereof. It will be understood that in the system as a whole there are between the oscillator 13 and code generator 11 and between the oscillator 13 and counter 12 certain logic and control elements associated with the code searching mechanism. This code searching mechanism synchronizes the code generator 11 and counter 12 with a similar code generator and counter (not shown herein) in the aircraft. This aircraft code generator is the generator labeled A in the above-cited application of Meuron and Lyons. Neither it nor the code searching mechanisms are shown in this application, as they are set forth in detail in the above-cited application and are not necessary for the description of the present invention.

Also provided in the missile system of FIG. 1 are a vertical field flip-flop 15 and a horizontal sync shaper 16. The function of these is to provide the sync information to the horizontal and vertical scan controls in the TV camera 17. The details of the vertical field sync flip-flop 15 and the horizontal sync shaper 16, as well as the TV camera 17, are not shown as they are well known in themselves in the art. The timing of the vertical and horizontal syncs is controlled by reference to the counter 12. When the next to last stage of the counter 12 is turned on, this sends a signal to the vertical field sync flip-flop which turns it on. When the vertical field sync flip-flop is on, a signal is sent to the vertical scan in the TV camera which causes it to retrace. Shortly thereafter by a signal from 2048 count position of counter 12 the vertical field sync flip-flop is turned off and the camera begins scanning again. A signal comes from the 64 count position of counter 12 to a flip-flop 18 which divides the signal by two and sends it to the horizontal sync shaper 16. Horizontal sync shaper 16 provides timing and blanking signals for the horizontal scan of the TV camera as is well known in the art. TV camera 17 sends its video signal but not its sync information to the video amplifier 19 which sends the video on the transmitter 20. During the portion of the horizontal sync period when the shaper 16 is not causing the camera to scan, it sends a signal to an AND gate 21. AND gate 21 also receives the succession of code pulses from code generator 11 from the fifteenth stage. When there is the aforesaid signal from the shaper 16, AND gate 21 will pass the code generated by generator 11 to the video amplifier 19. By this means therefore video amplifier 19 will pass to the transmitter 20 the code generated by generator 11 when it is not passing video signal, so that instead of the usual sync pulses in between the video portions there will be instead a sequence comprising a portion of the code sequence.

The vertical scan retraces once for every 256 horizontal sweeps. Actually there are 511 lines to a frame in the camera, but since the camera uses the interlace method, there are two fields to a frame, and 256 lines to a field.

Figure 2:
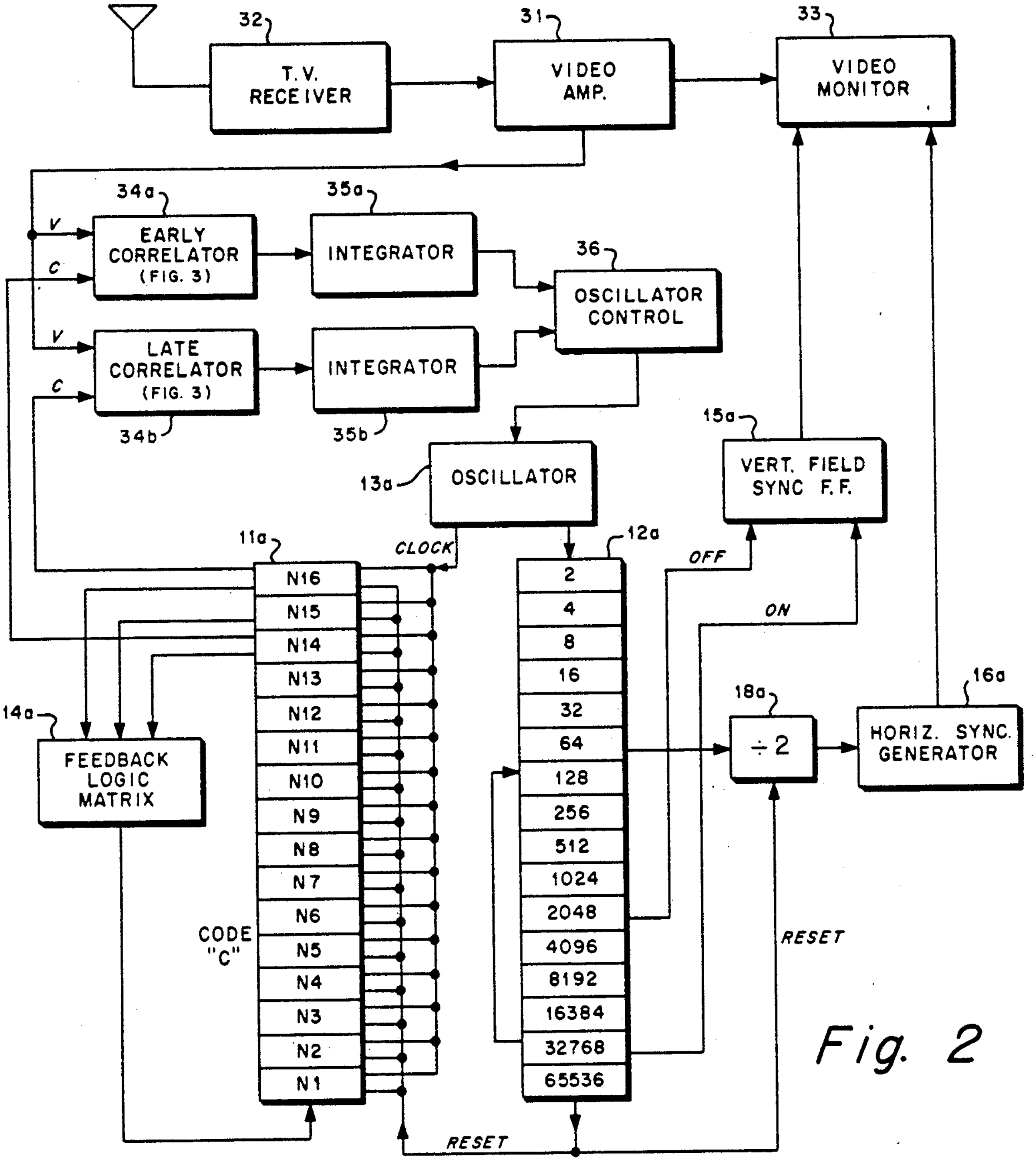
FIG. 2 shows a block diagram of a system in a guidance aircraft according to the present invention.

Turning now to FIG. 2 the aircraft system is similar to that in the missile. Wherever possible elements identical to those in the missile have been connoted by the same numeral with an "a" following. Specifically there is shown a code generator 11*a*, a counter 12*a*, as oscillator 13*a*, a feedback logic matrix 14*a* between the last three positions of generator 11*a* and beginning of generator 11*a*, a vertical field sync flip-flop 15*a*, a horizontal sync generator 16*a*, and a divide-by-two flip-flop 18*a*. The operation of these elements as shown is identical to that of the missile system described in connection with FIG. 1. In particular it is necessary that the feedback logic matrix 14*a* draw its three signals from the same positions of code generator 11*a* as were drawn from code generator 11 in the missile. This is necessary in order to insure that the code sequence generated by generator 11*a* will be identical to that of generator 11. It will be further understood that the same logic gates and other elements associated with the code searching mechanism are provided in the total system between oscillator 13*a* and generator 11*a* and counter 12*a*. These again are not shown as they are unnecessary to the description of the present invention. They are as before shown in the application to Meuron and Lyons, Ser. No. 370,741 cited above. In the case of the aircraft receiver system there is provided a video amplifier 31 which receives an incoming signal from TV receiver 32 and sends it to video monitor 33. Video monitor 33 also receives vertical and horizontal sync information from elements 15*a* and 16*a* which are timed by counter 12*a*.

Figure 3:
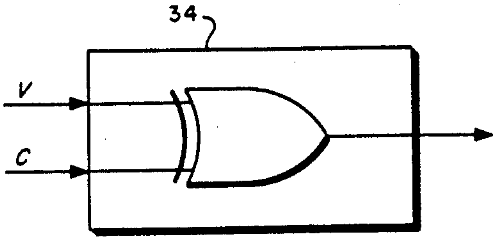
FIG. 3 shows a logic representation of an early or late correlator contained in the aircraft system of FIG. 2.

Also provided in the aircraft system are early correlator 34*a* and late correlator 34*b*. Each of these correlators sends a signal to an integrator 35*a*, *b* which sends a signal to oscillator control 36 which controls the frequency of oscillator 13*a*. Video amplifier 31 sends its signal to each of the early and late correlators 34*a*, *b* and the fourteenth and sixteenth stages in generator 11*a* send code sequences to the appropriate correlator. Each of the correlators is identical as shown in FIG. 3 and comprises an Exclusive OR logic gate. The characteristic of this gate is to send an output signal called a logic "1" when one or the other of the inputs is a "1" but not when both are "1". When both signals are "1's" or both are "0's" the output is a logic "0". By this means the gate will distinguish between matches and mismatches of incoming signals. It will be seen that the code signal coming into the late correlator will come from the sixteenth state of code generator 11*a*. This code sequence is one bit delayed from the synchronized code sequence. If the code portion of the received video signal begins to get behind it will begin to that extent to correlate with the late sequence coming out of the sixteenth stage of generator A. If the code portion of the signal coming into TV receiver is advanced it will begin similarly to correlate with the code sequence coming out of stage 14 which is one bit advanced from the synchronized code stage. If a correlation signal comes out of either the early or late correlators and is integrated on integrator 35*a* or *b* the integrator will send an appropriate signal to oscillator control 36 to speed up or slow down as may be necessary to center the operation of code generator 11*a* with respect to the received code portion of the TV signal. If there is a signal from the early correlator 34*a*, it means that the received signal is ahead of the generator 11*a*, and oscillator 13*a* will be speeded up. Similarly, if there is a signal from the late correlator 34*b*, oscillator 13*a* will be retarded. By this means then the code generator 11*a* and controlling counter 12*a* will be locked in to the received portion of the code in the return TV signal.

The particular means by which the integrator 35*a* or *b* will handle a correlation signal from early or late correlators 34*a*, *b* may be any one of a number of means known to a person in the art. One means, for example, utilizes the fact that the logic "1" out of a gate such as 34 is near ground and a logic "0" is customarily a plus or minus value, generally in the order of six volts. Now in the case when neither the early or late correlators are in substantial correlation with the code signal, approximately one-half of the signals out of logic gate 34 will be logic "1's" and the other half will be logic "0's". If integrator 35*a* or *b* is a capacitor with an appropriately chosen leakage resistance the voltage on the capacitor will tend to dissipate as fast as it collects when one-half of the signals only are logic "0's". However, should a succession of signals be sent indicating a match, producing a string of logic "0's", a voltage would collect on the integrator, and this signal would be transmitted to the oscillator control producing the appropriate speed-up or slowdown. By another means the logic gate 34 may be biased so that a logic "1" is a voltage of one polarity and a logic "0" is an equal voltage of the opposite polarity. Then if the logic "1's" and "0's" are more or less balanced the voltage on the capacitor in integrator 35*a* or *b* will continue to be zero. However, should a consistent match appear as would occur in the case of partial correlation a voltage would begin to collect on the appropriate capacitor. The integrator in this case will have a circuit such that a voltage of either polarity on the capacitor will cause an output voltage of one polarity to be sent to the oscillator control. This means will provide for the situation which may occur in the missile where the incoming signal in inverted due to data modulation and will therefore in the case of correlation provide a consistent mismatch. In this case the signal which goes to the oscillator control from integrator 35*a* would be of one polarity and the signal which goes from integrator 35*b* will be of the opposite polarity, so that the oscillator control and distinguish between them. This situation will occur in the missile lock means because the signal received by the missile may on occasion have data impressed on it. The reasons for this are cited in detail in the above-cited application of Meuron and Lyons.

The operation of the system will now be described. Code generator 11 in the missile system is designated as code B. This conforms to the designation shown in the above-cited application of Meuron and Lyons in which there is a code generator A, not shown in the present invention, which controls the operation of the entire system. It may be assumed in the operation of this system that code generator 11 is synchronized with the signal received from code generator A in the aircraft. It may also be assumed that a lock means similar to that described in the aircraft in FIG. 2 is present in the missile system of FIG. 1, although not shown. TV camera 17, therefore, takes a continuous TV picture of the view presented to the missile as it travels. The scanning of TV camera 17 is controlled by vertical sync 15 and horizontal sync 16 which are in turn controlled by counter 12. The video portion of the picture from TV camera 17 is sent to video amplifier 19 and interspersed with code portions from code generator 11, the combination of which are then transmitted by transmitter 20 back to the aircraft. In the aircraft the received TV signal containing portions of the code is received by receiver 32 and amplified in video amplifier 31. This signal is then sent to video monitor 33 which ignores the code portion thereof. The TV signal is also sent to early and late correlators 34*a*, 34*b*. It will be assumed that code generator 11*a*, which is code C, will have been synchronized with the incoming code portion of the signal from the missile by a code searching mechanism which is described in the above-cited application of Meuron and Lyons. Appropriate early and late code signals are sent from generator 11*a* to the early and late correlators and if either correlator begins to indicate a correlation the appropriate integrator will send the signal to the oscillator control which will cause oscillator 13*a* to speed up or slow down to hold generator 11*a* and counter 12*a* in line. Counter 12*a* is connected to vertical sync 15*a* and horizontal sync 16*a* in an identical manner to that of the missile. Vertical sync 15*a* and horizontal sync 16*a* send timing information to the video monitor 33 at the same portion of the TV signal as the vertical and horizontal scan signals occurred in the TV camera and the video monitor is thereby synchronized.

It will be observed that no sync pulses are sent with the video signal. Instead there is sent a portion of the code sequence. This code sequence can be blotted out if the jamming signal is strong enough. However, it should be pointed out that as long as nothing operates to get code generator 11*a* and counter 12*a* out of line or in synchronism they will continue to proceed at the same speed regardless. If only a very faint signal is received by the early and late correlator in comparison to the jamming signal there would be just sufficient correlation to hold oscillator 13*a* and generator 11*a* and counter 12*a* in synchronism in spite of the jamming signal and so long as counter 12*a* is in line it will continue to send the appropriate sync information to the video monitor regardless of the jamming signal.

It will be appreciated that the correlators 34 and the integrators 35, as well as the oscillator control 36, are found in both the missile and the aircraft since the missile code generator 11, which is code B, is synchronized with the signals from code generator A in the aircraft, and the second aircraft code generator 11*a*, which is Code C, is in turn synchronized with the signal from code generator 11, which is code B. The aircraft and the missile will also contain the code searching mechanism described in the above-cited Meuron and Lyons application.

Obviously many modifications and variations of the present invention are possible in the light of the above teachings. It is therefore to be understood that within the scope of the appended claims, the invention may be practiced otherwise than as specifically described.

What is claimed is:

1. A digital code synchronization locking means comprising:
 - means to receive a first digital code sequence;
 - means to generate a second digital code sequence substantially similar to said first sequence, said means to generate said second digital code sequence including:
 - a shift register having an output from a predetermined stage thereof;
 - a feedback logic matrix connected to said shift register for generating said second digital code sequence;
 - a binary pulse counter, the last stage of which provides a reset pulse to all the stages of said shift register;
 - means to detect drift from synchronization of said second code sequence with said first code sequence one stage before said predetermined stage and one stage after said predetermined stage;
 - a clock oscillator providing clock pulses to all stages of said shift register and to the first stage of said binary counter; and
 - an oscillator control connected to said clock oscillator and responsive to said means to detect drift for advancing the rate of said clock oscillator upon correlation of said first code sequence with said one stage before said predetermined stage and retarding the rate of said clock oscillator upon correlation of said first code sequence with said one stage after said predetermined stage, whereby said second code sequence is maintained in synchronization with said first code sequence.

2. A digital code synchronization locking means comprising:
 - means to receive a first digital code sequence;
 - means to generate a second digital code sequence substantially similar to said first sequence, said means to generate said second digital code sequence including:
 - a shift register having an output from a predetermined stage thereof;
 - a feedback logic matrix connected to said shift register for generating said second digital code sequence;
 - a binary pulse counter, the last stage of which provides a reset pulse to all the stages of said shift register;
 - a clock oscillator providing clock pulses to all stages of said shift register and to the first stage of said binary counter;
 - means to compare said first code sequence with said second code sequence from the stage before said predetermined stage;
 - means to advance the rate of said clock oscillator of said second code sequence upon correlation of said comparing means;
 - means to compare said first code sequence with said second code sequence from the stage after said predetermined stage;
 - and means to retard the rate of said clock oscillator connected to said second code sequence upon correlation of said second comparing means.

3. A digital code synchronization locking means as recited in claim 2 wherein each of said means to compare comprises:

an Exclusive OR gate having as inputs said first code sequence and the appropriate second code sequence;

and an integrating element adapted to receive the output of said Exclusive OR gate and express an output as a function of the sum of the output of said Exclusive OR gate.

4. A television transmission-reception system comprising:

a TV camera;

first means associated with said camera to generate a first digital code sequence;

means to control the vertical and horizontal scans of said camera by reference to predetermined portions of said first code sequence;

means for transmitting the video signal from said camera along with portions of said first code sequence;

means for receiving said transmitted signals remote from said transmitter;

a video monitor for receiving the video signal from said receiving means;

second means associated with said monitor to generate a second digital code sequence similar to said first code sequence;

means to control the vertical and horizontal sweeps of said monitor by reference to corresponding predetermined portions of said second code sequence;

and means for holding said second code sequence in synchronization with said first code sequence.

5. A television transmission-reception system as recited in claim 4 wherein said means to control the vertical scan of said camera comprises:

a vertical sync flip-flop turned on and off by signals from predetermined stages of said counter, the output of said flip-flop when on generating a retrace signal in said TV camera.

6. A television transmission-reception system as recited in claim 4 wherein said means for holding said second code sequence in synchronization with said first code sequence comprises:

first means for comparing said first code sequence with said second code sequence one stage before the output stage of said second code generating means;

means for advancing the oscillator clock of said second code sequence generating means upon a correlation signal from said first comparing means;

second comparing means for comparing said first code sequence with said second code sequence one stage after said output stage of said second code generating means;

and means for retarding said clock oscillator for said second code sequence generating means upon occurrence of a correlation signal from said second comparing means.

* * * * *